United States Patent
Pandey

(10) Patent No.: US 9,485,746 B2
(45) Date of Patent: Nov. 1, 2016

(54) LOCATION CLASSIFICATION ACCURACY FOR DEVICES INSIDE AND OUTSIDE OF A DEPLOYMENT AREA

(71) Applicant: Cisco Technology, Inc., San Jose, CA (US)

(72) Inventor: Santosh Pandey, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 14/294,392

(22) Filed: Jun. 3, 2014

(65) Prior Publication Data

US 2015/0351071 A1    Dec. 3, 2015

(51) Int. Cl.
*H04W 64/00* (2009.01)
*H04W 24/00* (2009.01)
*H04W 24/02* (2009.01)

(52) U.S. Cl.
CPC ........... *H04W 64/003* (2013.01); *H04W 24/00* (2013.01); *H04W 24/02* (2013.01)

(58) Field of Classification Search
CPC ............................. H04W 24/00; H04W 64/00
USPC ...................................................... 455/456.1
See application file for complete search history.

(56) References Cited

U.S. PATENT DOCUMENTS

| | | | | |
|---|---|---|---|---|
| 6,269,246 B1 * | 7/2001 | Rao | ....................... | H04W 64/00 455/186.1 |
| 6,393,294 B1 * | 5/2002 | Perez-Breva | ......... | H04W 64/00 342/451 |
| 6,992,625 B1 * | 1/2006 | Krumm | ................ | G01C 21/206 342/451 |
| 8,669,902 B2 | 3/2014 | Pandey et al. | | |
| 2003/0064735 A1 * | 4/2003 | Spain | ..................... | G01S 5/0252 455/456.1 |
| 2011/0077862 A1 * | 3/2011 | Huang | ................... | G01C 21/30 701/532 |
| 2011/0301912 A1 | 12/2011 | Pandey et al. | | |
| 2013/0035109 A1 * | 2/2013 | Tsruya | ................. | G01S 5/0252 455/456.1 |

OTHER PUBLICATIONS

Weston et al., "A User's Guide to Support Vector Machines", Humana Press, 2010, pp. 223-239.
Chang et al., "LIBSVM—A Library for Support Vector Machines", http://www.csie.ntu.edu.tw/~cjlin/libsvm/, retrieved Mar. 5, 2014, 4 pages.
Meraki, "White Paper Presence Analytics", Cisco Systems, Inc., May 2013, 14 pages.
Wikipedia, "Support Vector Machine", http://en.wikipedia.org/wiki/Support_vector_machine, retrieved Mar. 5, 2014, 13 pages.

* cited by examiner

*Primary Examiner* — William Nealon
(74) *Attorney, Agent, or Firm* — Edell, Shapiro & Finnan, LLC

(57) ABSTRACT

Techniques are presented to optimize location classification accuracy for wireless devices. A controller in communication with one or more wireless access points receives measurement data associated with signals received at one or more wireless access points from a plurality of wireless clients. The controller classifies each of the measurement data associated with a corresponding client as indicative a location inside of a particular region or outside of the particular region. The controller determines information of an actual location for each of the clients and classifies the information of the actual location as indicating a location inside of the particular region or outside of the particular region. For a given client whose classification of the information of the actual location does not match the classification of the corresponding measurement data, the controller modifies the information of the actual location of the given client.

20 Claims, 6 Drawing Sheets

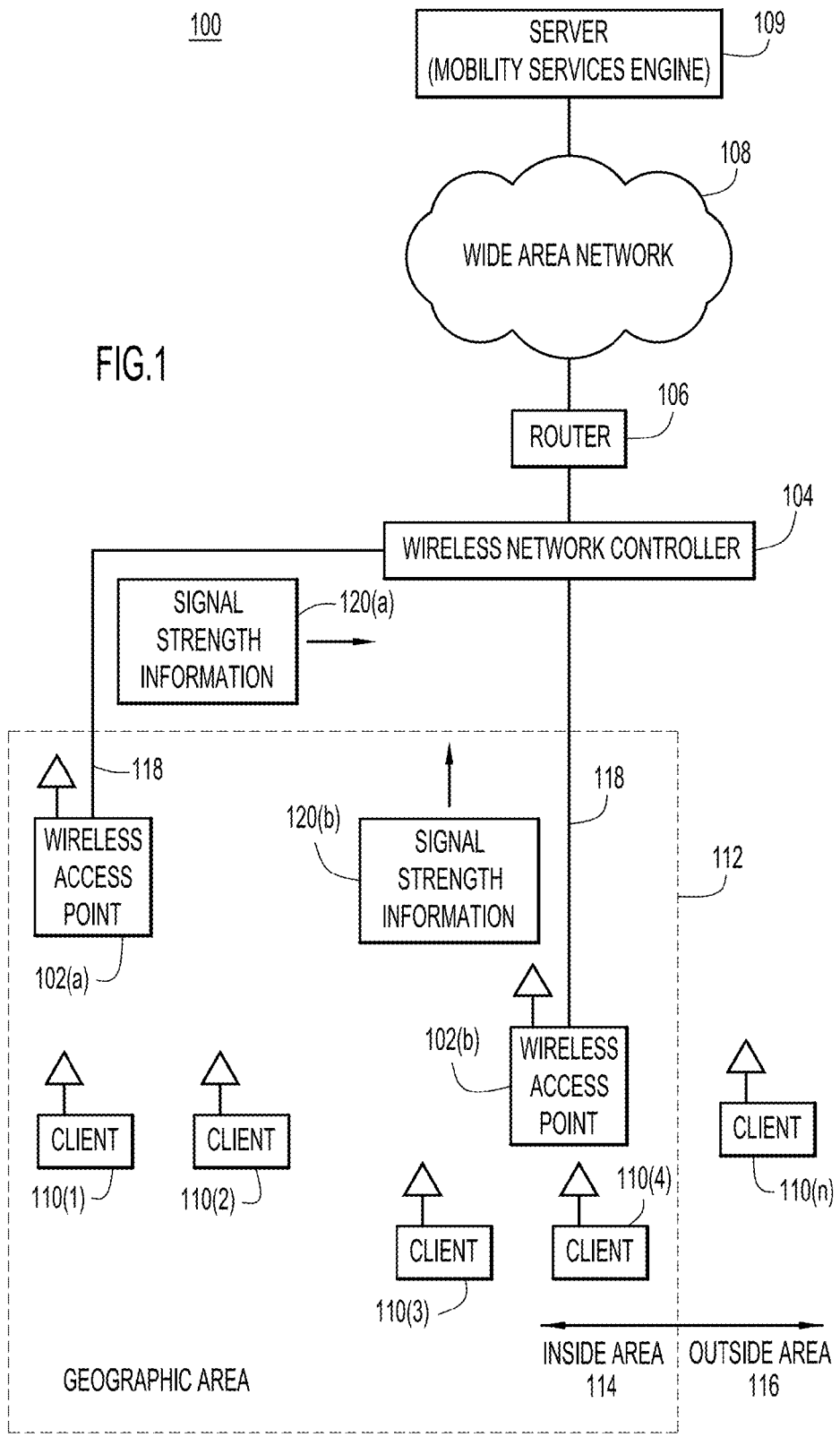

LOCATION CLASSIFICATION ACCURACY FOR DEVICES INSIDE AND OUTSIDE OF A DEPLOYMENT AREA

TECHNICAL FIELD

The present disclosure relates to optimizing location classification accuracy for wireless devices.

BACKGROUND

Wireless access points (APs) may be deployed to provide network connectivity to a Wide Area Network (WAN) for one or more wireless client devices. For example, a plurality of APs may be deployed in a particular region (e.g., within the boundaries of a building), and as the wireless client devices roam near an AP, the wireless client devices can access the WAN via the AP. Location information of the wireless client devices in a coverage area can be estimated based on signal strength information exchanged between the wireless client devices and the APs. Using the location information, the wireless client devices can be classified as residing within the particular region or outside of the particular region.

BRIEF DESCRIPTION OF THE DRAWINGS

FIG. 1 shows an example of a wireless local area network in which the enhanced location classification techniques presented herein may be deployed.

DESCRIPTION OF EXAMPLE EMBODIMENTS

Overview

Figure 2A:
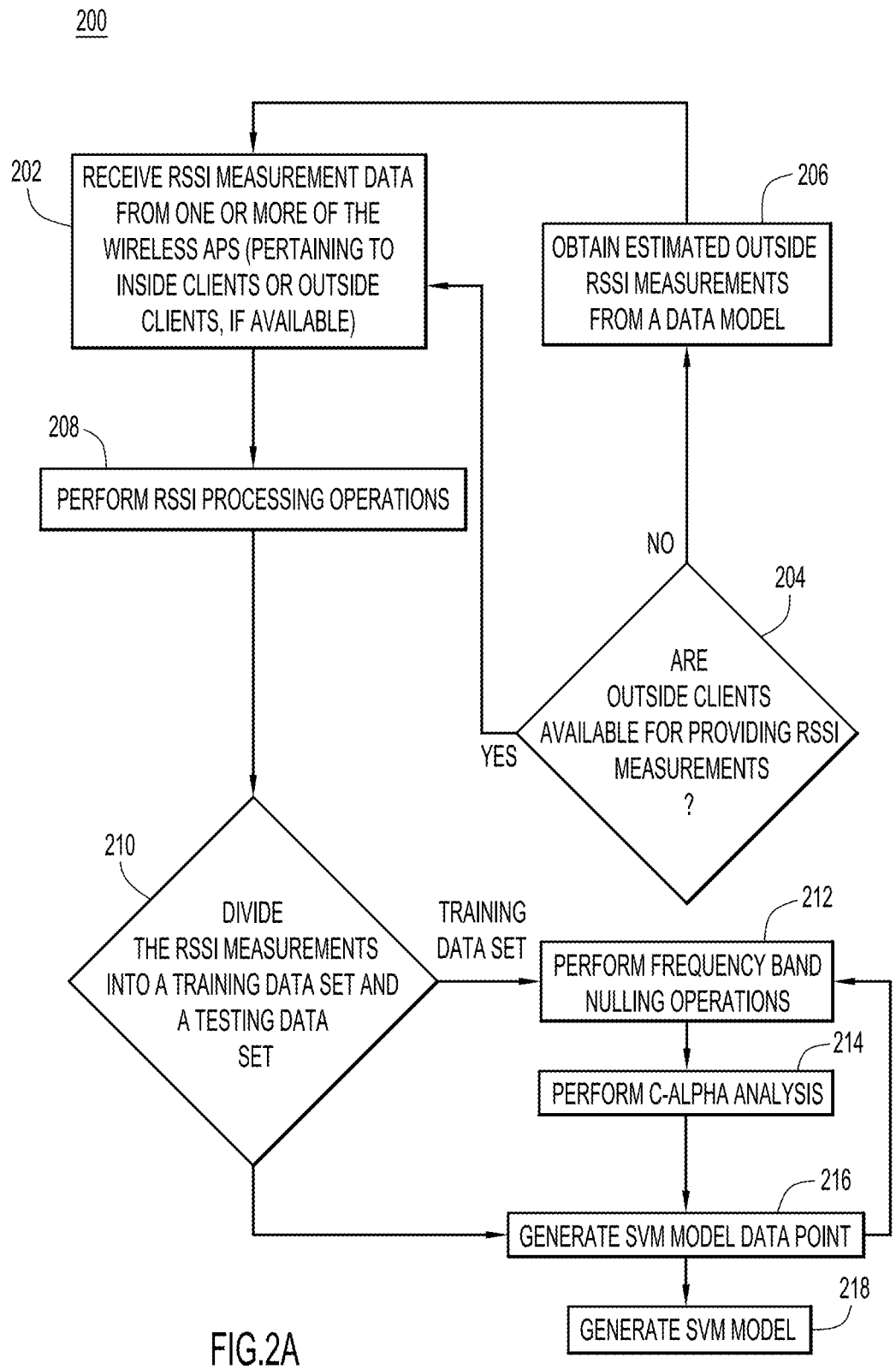
FIG. 2A shows a flow chart depicting operations performed during a training phase for the enhanced location classification techniques, according to an example embodiment.

Techniques are presented herein to optimize location classification accuracy for wireless devices. A controller device in communication with one or more wireless access point devices receives a plurality of measurement data associated with signals received at the one or more wireless access point devices from a plurality of wireless client devices. The controller device classifies each of the measurement data associated with a corresponding one the client devices as measurement data that is indicative of a location of the corresponding client device inside of a particular region or as measurement data that is indicative of a location of the corresponding client device outside of the particular region. The controller device determines information of an actual location for each of the client devices and classifies the information of the actual location as being indicative of a location inside of the particular region or as being indicative of a location outside of the particular region. For a given client device whose classification of the information of the actual location does not match the classification of the corresponding measurement data, the controller device modifies the information of the actual location of the given client device.

Example Embodiments

Techniques are presented herein for optimizing location classification accuracy for wireless devices. An example wireless local area network (WLAN) is shown at reference numeral 100 in FIG. 1. The WLAN 100 comprises a plurality of wireless access point devices ("wireless access points" or "wireless APs"), two of which are shown at reference numerals 102(*a*) and 102(*b*). Each of the wireless APs is configured to communicate over a wired or wireless mesh network connection with a wireless network controller device 104 ("wireless network controller," "wireless controller" or "controller device") that controls the APs. The wireless network controller device 104 is, in turn, configured to communicate with a router device 106 ("router") which is connected to a wide area network (WAN) 108 (e.g., the Internet). The WLAN 100 also has a plurality of wireless client devices 110(1)-110(*n*) ("wireless clients," "client devices" or "clients").

The wireless APs 102(*a*) and 102(*b*) are configured to wirelessly transmit traffic to and receive traffic from the clients 110(1)-110(*n*) that they serve, e.g., according to the Institute of Electrical and Electronic Engineering (IEEE) 802.11 standard. The wireless APs 102(*a*) and 102(*b*) may be deployed within a particular geographic region, as shown at reference numeral 112 in FIG. 1. The geographic region may also be referred to as a "geographic area" or "deployment area." In one example, the geographic region 112 in FIG. 1 may represent a building or other defined region within a building and in which the wireless APs 102(*a*) and 102(*b*) are deployed to provide network connectivity to clients. The geographic region 112 is defined as having an "inside" area shown at reference numeral 114 and an "outside" area shown at reference numeral 116. It should be appreciated that the inside area 114 and the outside area 116 may refer to actual locations relative to a boundary of region (e.g., inside and outside of a building). Alternatively, the inside area 114 and the outside area 116 may refer to regions relative to a predefined boundary set by a network administrator or manager. Thus, for example, the inside area 114 may define a particular region within a building, and the outside area 116 may include areas within the building that are outside of the particular region. In one example, the geographic region 112 may be an entire building, and in another example, the geographic region 112 may be one floor of a building. The techniques described hereinafter provide enhanced location classification for the clients 110(1)-110(*n*) to determine with accuracy whether or not the clients 110(1)-110(*n*) are located within the inside area 114 or the outside area 116 relative to the geographic region 112.

The clients 110(1)-110(*n*) are mobile devices (e.g., mobile phones, tablets, computing devices, laptops, etc.) that may be configured to move about with respect to the wireless APs 102(*a*)-102(*b*) in the WLAN 100. For example, a human user, using a mobile phone to access the WAN 108 via one of the wireless APs 102(*a*) and 102(*b*), may walk within or outside of the geographic region 112. Thus, the location of the clients 110(1)-110(*n*) may change as users move around.

The wireless network controller 104 is a network device that is configured to receive traffic (e.g., audio, video and/or any type of data communications) from the WAN 108 (via the router 106) and to deliver the traffic to the appropriate one of the wireless access points 102(a) and 102(b) for ultimate delivery to the clients. Thus, the wireless network controller 104 may be arranged in a local area network (LAN) with the wireless APs 102(a) and 102(b). The LAN is shown in FIG. 1 at reference numeral 118 as connections (e.g., wired or wireless connections) between the wireless APs 102(a) and 102(b) and the wireless network controller 104. For example, in FIG. 1, wireless APs 102(a) and 102(b) are in communication with, and under control of, the wireless network controller 104, and thus, the wireless network controller 104 is configured to deliver traffic from the WAN 108 to wireless APs 102(a) and 102(b) for ultimate wireless transmission to a client, and to receive traffic from clients and direct it to the WAN 108. As will become apparent hereinafter, the wireless network controller 104 is configured to perform enhanced location classification techniques for one or more of the clients 110(1)-110(n). It should be appreciated that in one example, the enhanced location classification techniques may be performed by another device in the network 100, e.g., a mobility services engine, in communication with the wireless access points 102(a) and 102(b) and/or the wireless network controller 104 and running on a server 109 connected to the wide area network 108. For simplicity, the enhanced location classification techniques are described as being performed by the wireless network controller 104, and it should be appreciated that these techniques are applicable to other devices in the network 100 (such as the on the server 109 running the mobility services engine)

The router 106 is a network device configured to enable communications to be routed from the WAN 108 to the wireless network controller 104 (e.g., for ultimate transmission to one or more of the wireless APs 102(a) and 102(b) and one or more clients 110(1)-110(n)). The router 106 also enables traffic to be routed from the wireless controller 104 (e.g., received by one or more of the wireless APs 102(a) and 102(b) and originating from one or more of the clients 110(1)-110(n)) to the WAN 108.

As stated above, the wireless APs 102(a) and 102(b) are configured to send wireless communications to, and receive wireless communications from, one or more clients 110(1)-110(n) that they serve. As shown in FIG. 1, each of the clients 110(1)-110(n) has at least one antenna to enable the wireless communications. Likewise, the wireless APs 102(a) and 102(b) also have one or more antennas to enable the wireless communications. In FIG. 1, wireless AP 102(a) serves clients 110(1) and 110(2), both of which are located in the inside area 114 of the geographic region 112. Wireless AP 102(b) serves clients 110(3) and 110(4), located in the inside area 114, and also serves client 110(n), located in the outside area 116 of the geographic region 112. The wireless APs 102(a) and 102(b) are configured to measure information indicative of the strength of signals exchanged with a client device that the wireless AP serves. For example, wireless AP 102(a) is configured to measure information indicative of the signal strength ("signal strength information") between client 110(1) and wireless AP 102(a) and also between client 110(2) and wireless AP 102(a). Likewise, wireless AP 102(b) is configured to measure signal strength information between client 110(3) and wireless AP 102(b), between client device 110(4) and wireless AP 102(b) and between client device 110(n) and wireless AP 102(b). The signal strength information may be, for example, received signal strength information (RSSI) measurements that are particular to specific client devices. For example, wireless AP 102(a) may measure an RSSI for signals received from each of client 110(1) and client 110(2), and wireless AP 102(b) may measure an RSSI for signals received from each of client 110(3), client 110(4) and client 110(n).

Wireless AP 102(a) and wireless AP 102(b) are each configured to send the signal strength information, measured for signals received from each respective client that the wireless APs serve, to the wireless network controller 104 via the LAN 118. FIG. 1 shows wireless AP 102(a) sending signal strength information 120(a) to the wireless network controller 104 and shows wireless AP 102(b) sending signal strength information 120(b) to the wireless network controller 104. The signal strength information 120(a) and 120(b) represent, e.g., the RSSI measurements for signals received from the clients served by each respective wireless AP. For example, the signal strength information 120(a) may contain an RSSI measurement for signals received from client 110(1) and an RSSI measurement for signals received from client 110(2). Likewise, the signal strength information 120(b) may contain an RSSI measurement for signals received from client 110(3), from client 110(4) and from client 110(n). The wireless network controller 104 receives the signal strength information 120(a) and 120(b), and uses the information (e.g., the RSSI information) for the clients 110(1)-110(n) to perform the enhanced location classification techniques, described herein.

In general, it may be advantageous for a network administrator to know the location of the clients 110(1)-110(n). For example, a network administrator may wish to know how many clients are operating within a particular geographic region (e.g., building) in order to ensure that there is a sufficient number of wireless APs deployed within the geographic region to provide adequate network connectivity to the clients and a WAN. For example, if there is a relatively large number of clients detected within a particular building or a floor of a building, a network administrator may deploy additional wireless APs within the particular building or floor to ensure that the clients are able to obtain adequate network connectivity to the WAN 108. As a result, it is important to determine the location of the clients 110(1)-110(n) relative to the geographic region 112 and to classify accurately the location of the clients 110(1)-110(n) as being within the geographic region 112 (in the inside area 114) or outside of the geographic region 112 (in the outside area 116). With such information, a network administrator can ensure that there are enough wireless APs deployed within the geographic region 112 to provide adequate network connectivity to the WAN 108 for clients within the geographic region 112.

Existing location classification techniques, however, do not accurately classify clients as being located within a geographic region or outside of a geographic region. For example, existing location classification techniques often report an inaccurately large number of clients within a geographic region. For example, current client location techniques (such as maximum likelihood techniques with Radio Frequency (RF) fingerprinting) have a tendency of determining the location of clients as being within a convex hull (e.g., within a geographic region) even though such clients are located outside of a convex hull. The practical impact is that the location of clients that are actually outside of a geographic region will erroneously be determined to be within the geographic region. In other words, existing location classification techniques fail to accurately classify devices as either inside or outside of a given geographic region. This problem is compounded by the fact that often, clients that merely "pass by" the geographic region without entering within it may be erroneously determined to be located within the geographic region for a period of time until the client is marked as absent (e.g., 20 minutes). For example, a client device in an automobile may drive by a building where one or more APs are operating, and for a period of 20 minutes the client device may be detected as being within the geographic region, even though the automobile has long since left the proximity of the building.

The techniques described herein alleviate these drawbacks by enabling the wireless network controller 104 to accurately classify the location of the clients 110(1)-110(n). For example, as described herein, the wireless network controller 104 is able to modify information of the actual location of a client device in the WLAN 100 to ensure that the classification of the actual location of the client device matches a location classification of the client device based on measurement data.

In general, according to the techniques described herein, the wireless network controller 104 utilizes a machine learning algorithm to generate a classification model, the basis of which is used to classify the clients 110(1)-110(n) as being within the inside area 114 or the outside area 116 relative to the geographic region 112. For example, the wireless network controller 104 may first operate in a "training phase" in which the wireless network controller 104 receives training measurement data from the wireless APs 102(a) and 102(b). The measurement data comprises, for example, RSSI measurements that are indicative of the receive signal strength between wireless APs 102(a) and 102(b) and the respective client devices that they serve. The wireless network controller 104 then performs filtering operations on the training measurement data and uses the machine learning algorithm to generate a classification model. The classification model is later used during a testing (online or operational) phase to classify measurement data for each of the clients 110(1)-110(n) as belonging in a first classified group or a second classified group. It should be appreciated that the training measurement data may be generated, for example, by select clients (e.g., other than clients 110(1)-110(n)) configured to move around the WLAN 100 both within the geographic region 112 and outside of the geographic region 112.

The first classified group (first group), for example, is a classification for clients as being within the inside area 114 of the geographic region 112, as shown in FIG. 1. The second classified group (second group), for example, is a classification for clients as being in the outside area 116, as shown in FIG. 1. Thus, in the training phase, as described herein, the wireless network controller 104 generates a model for classifying measurement data (e.g., RSSI measurements) as belonging in the first classified group or in the second classified group.

After the wireless network controller 104 generates the classification model, the wireless network controller 104 performs operations in the testing phase. In the testing phase, the wireless network controller 104 determines information indicative of an actual location for each of the clients 110(1)-110(n), and based on this information, the wireless network controller 104 classifies the information of the actual location as belonging in the first classified group or in the second classified group. The wireless network controller 104 is configured to modify the information of the actual location of a client whose classification of the actual location does not match the classification based on the classification model for the client. These techniques are described in further detail hereinafter.

Reference is now made to FIG. 2A, which shows an example flow chart 200 depicting operations performed by the wireless network controller 104 during the training phase for the enhanced location classification techniques. At operation 202, the wireless network controller 104 receives RSSI measurement data from one or more of the wireless APs 102(a) and 102(b). The RSSI measurement data is received from the APs on behalf of clients in the inside area 114 and on behalf of clients in the outside area 116. It should be appreciated that the RSSI measurement data is merely an example. Other types of measurement data useful for location computations of clients could be used, such as angle-of-arrival, time-of-arrival, etc. The RSSI measurement data includes training RSSI measurements for clients known to be within the geographic region 112 and RSSI measurements for clients known to be outside the geographic region 112. It should be appreciated that the wireless network controller 104 may be pre-provisioned with the boundaries of the geographic region 112 before the start of the training phase. In other words, the wireless network controller 104 may be pre-provisioned to know the boundaries of the geographic region 112 in order to create the classification model to classify RSSI measurements as within the geographic region 112 or outside the geographic region 112. As the wireless network controller 104 receives the RSSI measurements, the wireless network controller 104 is informed of the classification of the associated clients. That is, for each RSSI measurement, the wireless network controller 104 knows whether or not the associated client is located in the inside area 114 or the outside area 116 of the geographic region 112. The purpose of the training phase is to determine appropriate expected RSSI values for clients within the inside area 114 and the outside area 114.

It should be appreciated that, in one scenario, when there are no clients in the outside area 116 ("outside clients"), random RSSI measurements may be provided to the wireless network controller 104. For example, as shown at reference numeral 204, a determination is made as to whether or not outside clients are available for providing RSSI measurements, and if not, at 206, estimated RSSI measurements for outside clients are obtained from a data model and the random RSSI measurements are provided to the wireless network controller 104. If outside clients are available, the RSSI measurements for the outside clients are provided to the wireless network controller 104 by the wireless APs 102(a) and 102(b). In one example, a user or network administrator may indicate to the wireless network controller 104 the availability or unavailability of outside clients (e.g., during a training phase). It should be appreciated that the wireless network controller 104 may not be informed that the RSSI measurements are part of a training phase. The wireless network controller 104, in one example, treats each measured RSSI signal as if the RSSI measurement is observed during a normal course of operation.

After the wireless network controller 104 receives the RSSI measurements, at 208, the wireless network controller 104 performs RSSI processing operations. The RSSI processing operations include, for example, normalizing the RSSI measurements. In one example, the RSSI measurements are normalized to a value between −1 and +1, based on, for example, the RSSI measurements (dBm). For example, a RSSI measurement value of −10 dBm for an RSSI measurement may be normalized to a −1 value, and an RSSI value of −90 dBm may be normalized to a +1 value.

RSSI values outside of this range may be dropped as being unreliable/outliers. After the RSSI measurements are normalized, the wireless network controller 104 determines maximum RSSI measurements. For example, for a given wireless AP (e.g., an "AP-slot"), there may be two antennas and one RSSI reported per antenna.

In one example, as RSSI measurements are obtained, the RSSI measurements are arranged, for example in a table with rows and columns. The rows each represent measured RSSI values, and the column length is determined by the number of possible AP interfaces available for a given geographic area. For example, if a geographic area has one AP with two slots and two antennae per slot, then the total number of interfaces (and hence the total number of columns) is equal to four (i.e., 1 AP×2 slots×2 antennae). In another example, if a geographic region has 25 APs, and if each AP has two slots and two antennas per slot, the total number of columns is equal to 100 (i.e., 25×2×2). An additional column is added to indicate if the measurement row is an "inside" measurement or an "outside" measurement, and thus, when a measurement is populated as a row, the columns representing the interface for which the RSSI values are available are populated accordingly. Missing columns are filled with a +1 RSSI value. The wireless controller device 104 then determines whether or not the number of RSSI measurements for clients within the geographic region 112 ("inside clients") is equal to the number of RSSI measurements for outside clients. If not, the wireless controller device 104 duplicates RSSI measurements for clients in the group with less measurements to ensure that there is a same number of RSSI measurements for inside clients and as for outside clients.

At operation 210, the wireless network controller 104 divides the RSSI measurements into a training data set (training processing group) and a testing data set (operational processing group). It should be appreciated that the training data set and the testing data set are still used during the training phase presently described. In one example, approximately 20% of the RSSI measurements are selected for the testing data set and 80% of the RSSI measurements are selected for the training data set. For the data in the training data set, at operation 212, the wireless network controller 104 performs frequency band nulling ("band nulling") operations on each of the RSSI measurements and the resultant set is added to the training set. In one example, the band nulling operations are performed twice on each RSSI measurement. A first band nulling operation is performed at a first frequency band (e.g., 2.4 GHz), wherein it is assumed that the data from the first band is missing (e.g. received at −127 dBm) while keeping the data from the other band (e.g., 5 GHz) unchanged. An additional second band nulling operation is performed at a second frequency band (e.g., 5 GHz), wherein it is assumed that the data from the first band is missing (e.g. received at −127 dBm) while keeping the data from the first frequency band (e.g. 2.4 GHz).

After the band nulling operation, the wireless network controller 104, at operation 214, performs a C-alpha analysis. The C-alpha analysis provides weighted vector values that are used to build a location classification model for the RSSI measurements. The C-alpha analysis, for example, generates support vector coefficients within a certain regression estimation (e.g., different combinations of the values of C and alpha). In this, a range of values of C and alpha is considered. For each combination of C and alpha, the SVM training is run on the training data set and SVM prediction is tested using the testing data set. The combination of C and alpha resulting in the best predication is used to create SVM model for the entire data collected during the testing phase, i.e. training data set and testing data set. After performing the C-alpha analysis, the wireless network controller 104, at operation 216, generates a support vector machine (SVM) model (e.g., using all RSSI measurement data). In general, the SVM model is a statistical model that is applied to pattern recognition, regression estimation, etc. An SVM model allows a user (e.g., a network administrator) to carry out pattern recognition and regression estimates using SVM techniques on a set of given data. The SVM model described herein provides a network administrator with a location classification model for given RSSI measurements. That is, the SVM model provides the network administrator with a model of RSSI measurements classified as inside measurements and RSSI measurements classified as outside measurements. This SVM model can be used during a normal operational phase to predict a classification for RSSI measurements obtained for the clients 110(1)-110(n). Thus, the SVM model provides a frame of reference for classifying the location of clients 110(1)-110(n) as inside or outside devices as RSSI measurements for the clients 110(1)-110(n) are obtained by the wireless network controller 104 during the normal operational phase. In one example, the RSSI with the most accurate C-alpha analysis is used as the basis for the SVM model. It should be appreciated that operation 216 is performed for the approximately 20% of the RSSI measurements selected for the testing data set and 80% of the RSSI measurements are selected for the training data set.

Figure 2B:
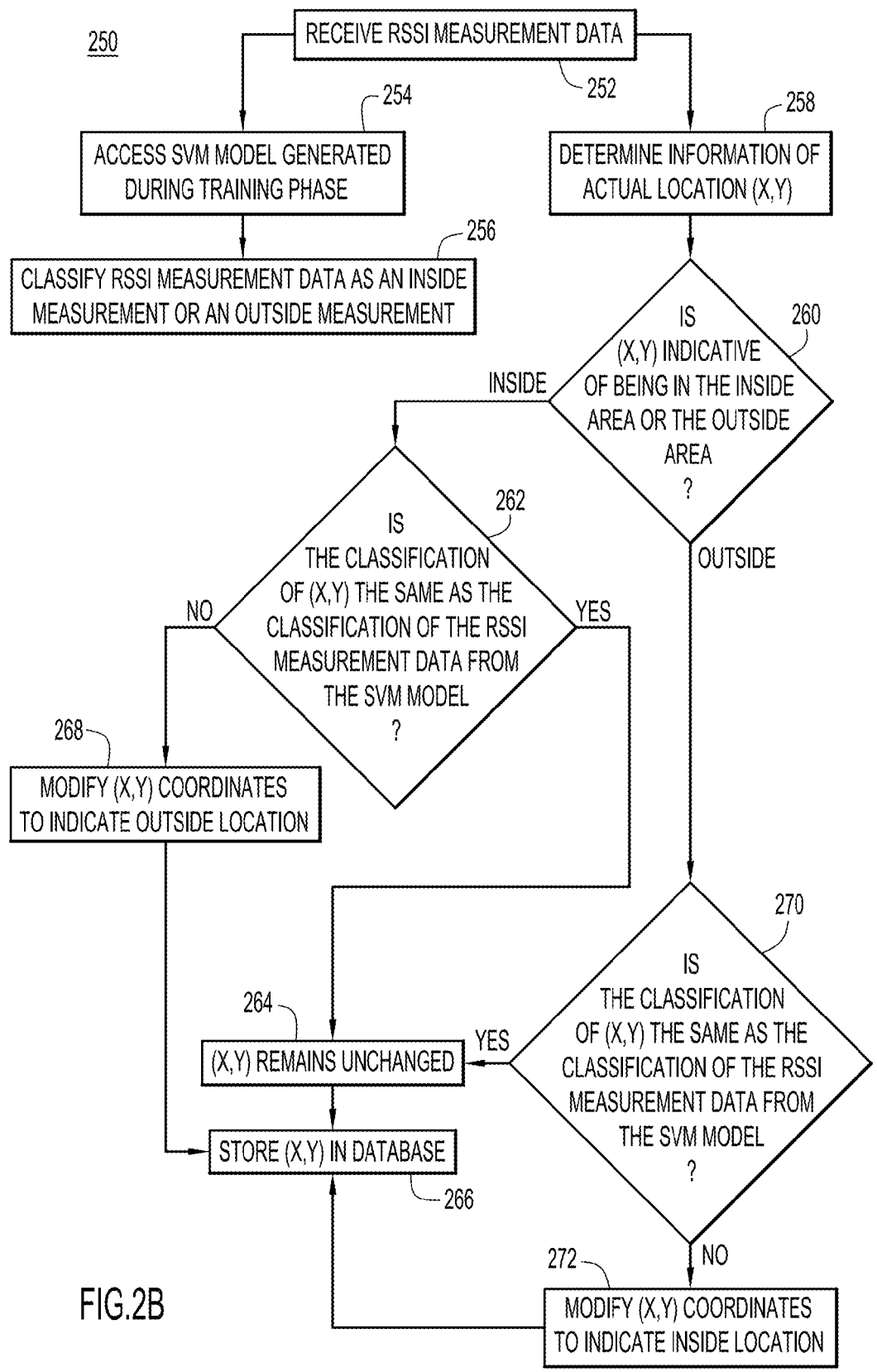
FIG. 2B shows an flow chart depicting operations performed during a testing phase for the enhanced location classification techniques, according to an example embodiment.

Reference is now made to FIG. 2B, which shows an example flow chart 250 depicting operations performed by the wireless network controller 104 during the normal operational phase (e.g., an online or actual use) for the enhanced location classification techniques. As described above, during the online phase, the wireless network controller 104, at 252, receives RSSI measurement data from one of the wireless APs 102(a) and 102(b). This RSSI measurement data is indicative of the signal strength between a wireless AP and a corresponding client served by the wireless AP. After receiving the RSSI measurement data, the wireless network controller 104, at 254, accesses the SVM model (generated during the training phase described in connection with FIG. 2A, above). At 256, the wireless network controller 104 classifies the RSSI measurement data as an "inside" measurement or an "outside" measurement. An inside measurement is indicative of an RSSI measurement for a client located within the inside area 114 of the geographic region 112. An outside measurement is indicative of an RSSI measurement for a client located within the outside area 116 of the geographic region 112.

Additionally, after receiving the RSSI measurement in operation 252, the wireless network controller 104, at operation 258, determines information of an actual location of a client associated with the received RSSI measurement. For example, the wireless network controller 104 may compute an actual location of the client associated with the RSSI measurement using known location detection techniques (such as maximum likelihood location detection techniques with RF fingerprinting). Information of the actual location of the client may be represented as a set of location coordinates (shown as "(x,y)" coordinates in FIG. 2B).

After determining information of an actual location of a client associated with the received RSSI measurement, the wireless network controller 104, at operation 260, determines whether the (x,y) coordinate is indicative of the device being within the inside area 114 of the geographic region 112 (i.e., an "inside" device) or if the (x,y) coordinate is indicative of the device being in the outside area 116 (i.e., an "outside" device). If the client is determined to be an inside device, at operation 262, the wireless network controller 104 compares the classification of the client based on the information generated in operation 258 with the classification of the RSSI measurement determined in operation 256. If the classification in operation 258 is the same as the classification in operation 256 (i.e., if both the SVM model and the information of the actual location indicate that the client is an inside device), the (x,y) coordinates indicative of the actual location remains unchanged, as shown in operation 264, and these coordinates are stored in a database 266. If, however, the classification in operation 258 is different from the classification in operation 256 (i.e., if the SVM model classifies the RSSI measurement as an outside measurement while the (x,y) coordinates indicate that the client is an inside device), the (x,y) coordinates indicative of the actual location are modified at operation 268 in FIG. 2B. In one example, the wireless network controller 104 modifies the (x,y) coordinates, at operation 268, such that that modified (x,y) coordinates are indicative of a location in the outside area 116. For example, the (x,y) coordinates are changed (e.g., "snapped") to new coordinates indicative of a location just outside of the perimeter of the geographic region 112. The new coordinates are stored in the database, as shown in operation 266.

If the wireless network controller 104, in operation 260, determines that the client is an outside device, the wireless network controller 104 compares, at 270, the classification of the client based on the information generated in operation 258 with the classification of the RSSI measurement determined in operation 256. If the classification in operation 258 is the same as the classification in operation 256 (i.e., if both the SVM model and the information of the actual location indicate that the client is an outside device), the (x,y) coordinates remain unchanged, as shown in operation 264, and the (x,y) coordinates are stored in the database, as described in connection with operation 266 above. If, however, the classification in operation 258 is different from the classification in operation 256 (i.e., if the SVM model classifies the RSSI measurement as an inside measurement while the (x,y) coordinates indicate that the client is an outside device), the (x,y) coordinates indicative of the actual location are modified at operation 272. In one example, the wireless network controller 104 modifies the (x,y) coordinates at operation 272 such that the modified (x,y) coordinates are indicative of a location within the inside area 114 of the geographic region 112. For example, the (x,y) coordinates are changed (e.g., "snapped") to new coordinates indicative of a location just inside of the perimeter of the geographic region 112. The new coordinates are stored in the database, as shown in operation 266.

Thus, by the above process, the wireless network controller 104 is able to utilize the SVM model generated during the training phase to increase accuracy of location classification for the clients 110(1)-110(n) for RSSI measurements received during the online phase. These enhanced techniques compensate for the drawbacks and inaccuracies generally associated with known location techniques by correctly classifying a client as being located within or outside of a geographic region. It should be appreciated that any machine learning algorithm may be used to classify the RSSI measurements during the training phase and that SVM is merely an example.

Figure 3:
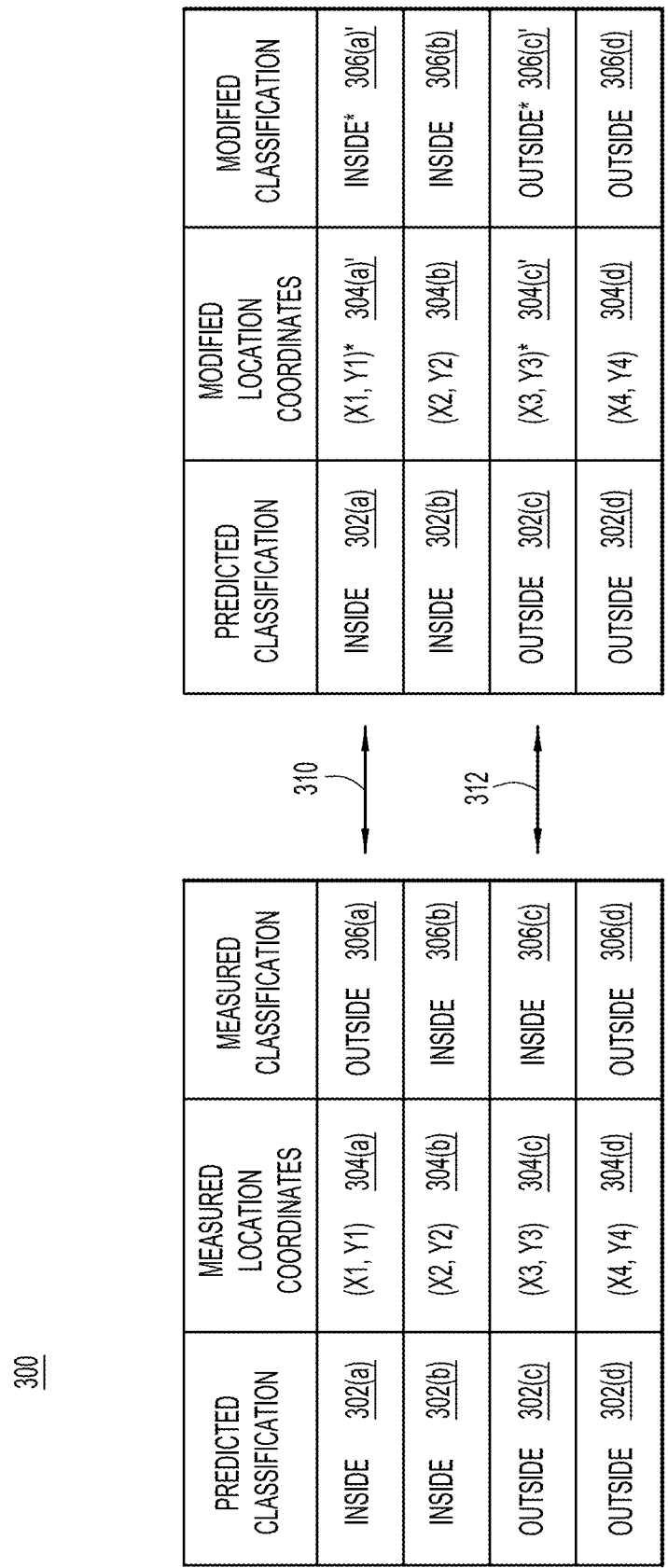
FIG. 3 shows a location classification database depicting modified locations of one or more wireless client devices, according to an example embodiment.

Reference is now made to FIG. 3, which shows an example database 300 maintained or accessible by the wireless network controller 104 with location coordinates of a client. The database 300 in FIG. 3 shows predicted classifications 302(a)-302(d) for RSSI measurements associated with clients. The predicted classifications may be, for example, classifications based on the SVM model as inside measurements or outside measurements, as described above. The database 300 also shows, at reference numerals 304(a)-304(d), coordinates indicative of measured locations. These coordinates are generated, for example, as described in connection with operation 258 in FIG. 2B, above. The measured coordinates have an associated inside classification or an outside classification, as shown at reference numerals 306(a)-306(d).

As described above in connection with FIG. 2B, when the predicted classification does not match the measured classification, the measured coordinates are modified such that the measured classification matches the predicted classification. These modifications are shown at arrows 310 and 312. For example, in database 300, the measured coordinates $(x_1,y_1)$ indicate an "outside" classification, and since the measured classification 306(a) does not match the predicted classification 302(a), the coordinates $(x_1,y_1)$ associated with the measured classification 306(a) are modified to coordinates $(x_1,y_1)^*$ shown at reference numeral 304(a)'. This modification is represented by arrow 310. As a result, the associated measured classification 306(a)' changes to an inside classification, and thus, the information of the actual location of a given client device is classified in a same area (inside area 114) relative to the geographic region 112 as the measurement data associated with the given client device. In another example, the measured coordinates $(x_3,y_3)$ indicate an "inside" classification, and since the measured classification 306(c) does not match the predicted classification 302(c), the coordinates $(x_3,y_3)$ associated with the measured classification 306(c) are modified to coordinates $(x_3,y_3)^*$ shown at reference numeral 304(c)'. This modification is represented by arrow 312. As a result, the associated measured classification 306(c)' changes to an outside classification, and thus, the information of the actual location of a given client device is classified in a same area (outside area 116) relative to the geographic region 112 as the measurement data associated with the given client device. The coordinates $(x_2,y_2)$ and $(x_4,y_4)$ remain unchanged since the corresponding measured classifications match the predicted classifications.

Figure 4:
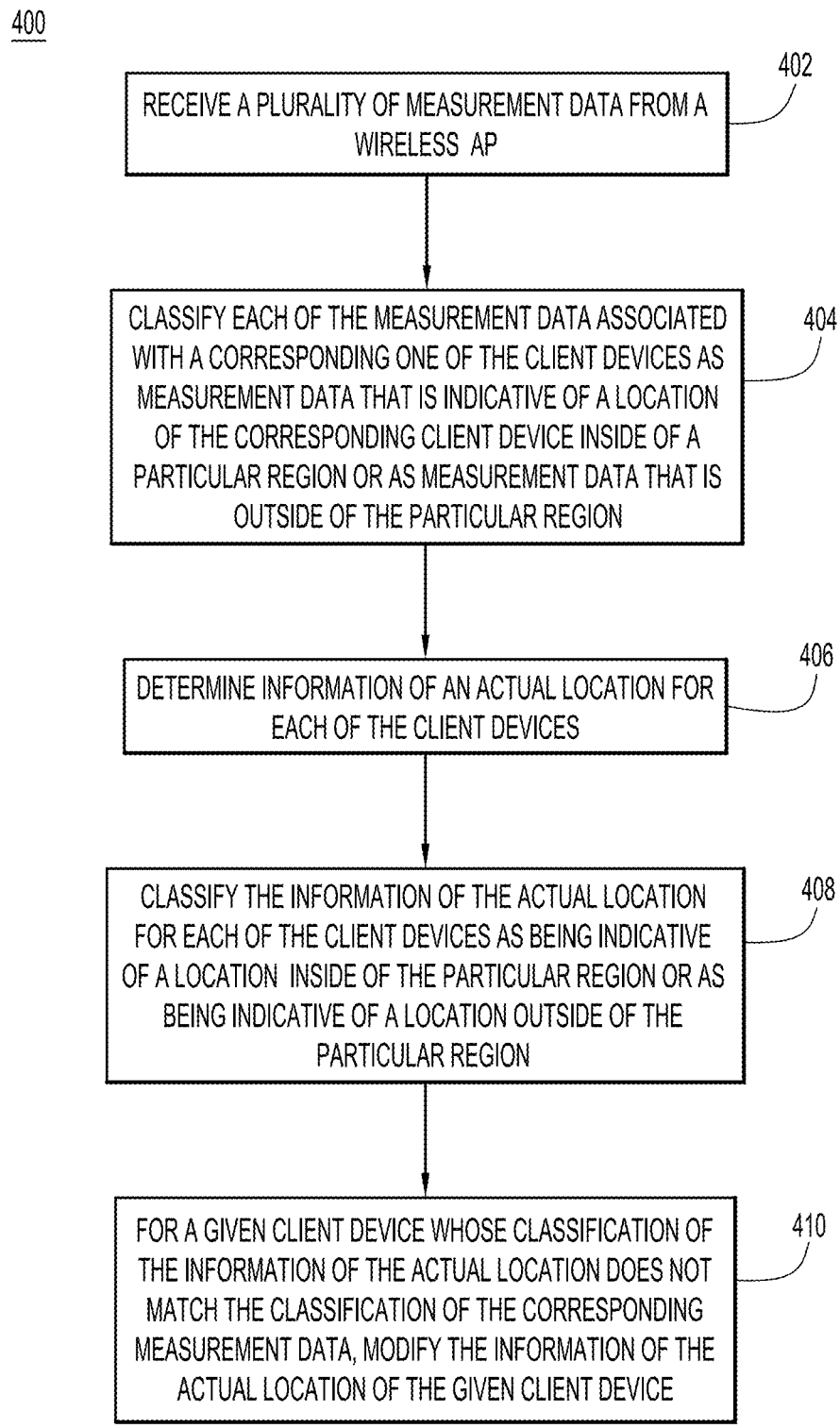
FIG. 4 shows a flow chart depicting operations performed by a controller device in the wireless local area network to perform the enhanced location classification techniques, according to an example embodiment.

Reference is now made to FIG. 4, which shows an example flow chart 400 depicting operations performed by the wireless network controller 104 to perform the enhanced location classification techniques. At operation 402, the wireless network controller 104 receives a plurality of measurement data from a wireless AP. The measurement data may be RSSI measurement data received from either wireless AP 102(a) or wireless AP 102(b). The measurement data is associated with signals received at one or more wireless APs from a plurality of wireless client devices. The wireless network controller 104, at 404, classifies each of the measurement data associated with a corresponding one of the client devices as measurement data that is indicative of a location of the corresponding client device inside of a particular region (e.g., the inside area 114 shown in FIG. 1) or as measurement data that is indicative of a location of the corresponding client device outside of the particular region (e.g., the outside area 116 shown in FIG. 1). At 406, the wireless network controller 104, determines information of an actual location for each of the client devices, and at 408, classifies the information of the actual location for each of the client devices as being indicative of a location inside of the particular region or as being indicative of a location outside of the particular region. For example, the controller device may be provided with the boundaries of the geographic region 112, and after determining the actual location for a client device (e.g., determining the (x,y) coordinates), the controller can classify the actual location as being within or outside of the geographic region. At 410, for a given client device whose classification of the information of the actual location does not match the classification of the corresponding measurement data, the wireless network controller 104 modifies the information of the actual location of the given client device.

Figure 5:
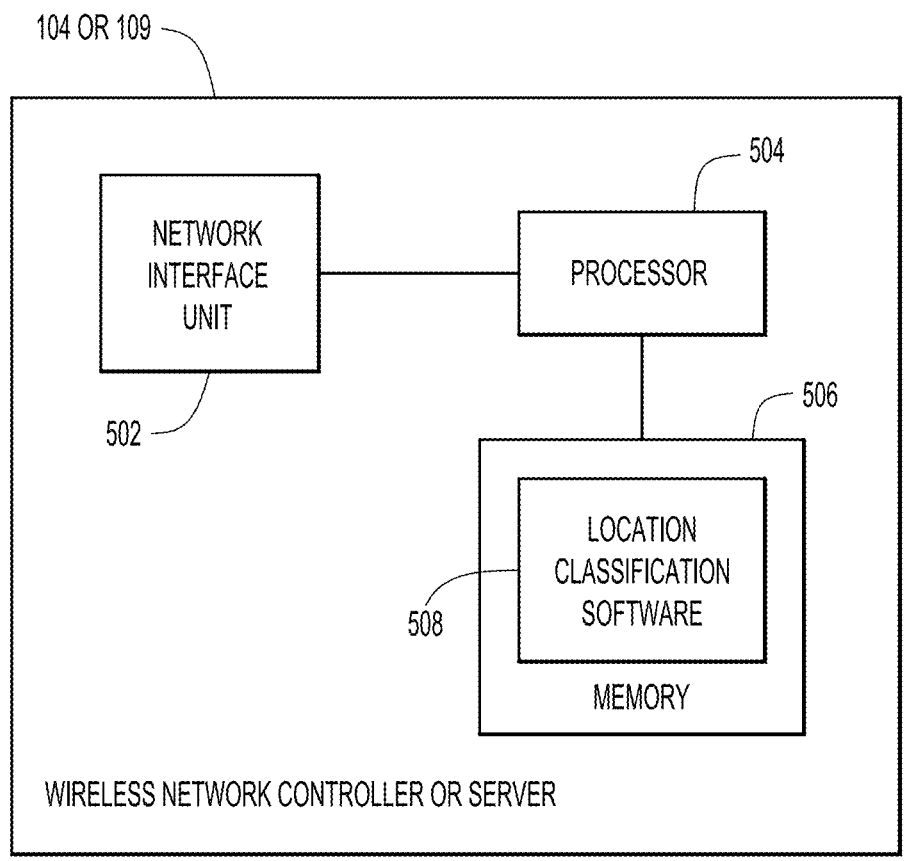
FIG. 5 shows a block diagram of the controller device configured to perform the enhanced location classification techniques, according to an example embodiment.

Reference is now made to FIG. 5. FIG. 5 shows an example block diagram of the wireless network controller 104 or server 109 running the mobility services engine. In FIG. 5, the wireless network controller 104 comprises a network interface unit 502, a processor 504 and a memory 506. The network interface unit 502 enables wired network communication, e.g., with the wireless APs 102(*a*) and 102(*b*) and the router 106. The processor 504 may be a microprocessor or microcontroller. In one example, the processor 504 is configured to execute location classification software 508, stored in memory 506, to perform the enhanced location classification techniques described herein. The functions of the processor 504 may be implemented by logic encoded in one or more tangible computer readable storage media or devices (e.g., storage devices, compact discs, digital video discs, flash memory drives, etc. and embedded logic such as an application specific integrated circuit, digital signal processor instructions, software that is executed by a processor, etc.).

The memory 506 may comprise read only memory (ROM), random access memory (RAM), magnetic disk storage media devices, optical storage media devices, flash memory devices, electrical, optical, or other physical/tangible (non-transitory) memory storage devices. Thus, in general, the memory 506 may comprise one or more computer readable storage media (e.g., a memory storage device) encoded with software comprising computer executable instructions and when the software is executed (e.g., by the processor 504) it is operable to perform the operations described for the location classification software 508.

The location classification software 508 (e.g., one function of the mobility services engine referred to above) may take any of a variety of forms, so as to be encoded in one or more tangible computer readable memory media or storage devices for execution, such as fixed logic or programmable logic (e.g., software/computer instructions executed by a processor), and the processor 504 may be an application specific integrated circuit (ASIC) that comprises fixed digital logic, or a combination thereof.

For example, the processor 504 may be embodied by digital logic gates in a fixed or programmable digital logic integrated circuit, which digital logic gates are configured to perform the operations of the location classification software 508. In general, the location classification software 508 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the wireless APs 102(*a*) and 102(*b*) and the wireless network controller 104 may be performed by one or more computer or machine readable storage media (non-transitory) or device executed by a processor and comprising software, hardware or a combination of software and hardware to perform the operations described herein.

In summary, a method is provided comprising: at a controller device in communication with one or more wireless access point devices, receiving a plurality of measurement data associated with signals received at the one or more wireless access point devices from a plurality of wireless client devices; classifying each of the measurement data associated with a corresponding one of the client devices as measurement data that is indicative of a location of the corresponding client device inside of a particular region or as measurement data that is indicative of a location of the corresponding client device outside of the particular region; determining information of an actual location for each of the client devices; classifying the information of the actual location as being indicative of a location inside of the particular region or as being indicative of a location outside of the particular region; and for a given client device whose classification of the information of the actual location does not match the classification of the corresponding measurement data, modifying the information of the actual location of the given client device.

In addition, one or more computer readable storage media encoded with software is provided comprising computer executable instructions and when the software is executed operable to: receive a plurality of measurement data associated with signals received at one or more wireless access point devices from a plurality of wireless client devices; classify each of the measurement data associated with a corresponding one of the client devices as measurement data that is indicative of a location of the corresponding client device inside of a particular region or as measurement data that is indicative of a location of the corresponding client device outside of the particular region; determine information of an actual location for each of the client devices; classify the information of the actual location as being indicative of a location inside of the particular region or as being indicative of a location outside of the particular region; and modify the information of the actual location of a given client device whose classification of the information of the actual location does not match the classification of the corresponding measurement data.

Furthermore, an apparatus is provided comprising: a network interface unit configured to enable network communications; and a processor coupled to the network interface unit, and configured to: receive via the network interface unit a plurality of measurement data associated with signals received at one or more wireless access point devices from a plurality of wireless client devices; classify each of the measurement data associated with a corresponding one of the client devices as measurement data that is indicative of a location of the corresponding client device inside of a particular region or as measurement data that is indicative of a location of the corresponding client device outside of the particular region; determine information of an actual location for each of the client devices; classify the information of the actual location as being indicative of a location inside of the particular region or as being indicative of a location outside of the particular region; and modify the information of the actual location of a given client device whose classification of the information of the actual location does not match the classification of the corresponding measurement data.

It should be understood that while the techniques presented herein are described as being applicable to determining a location of a wireless client device, they be used for other (non-location related) purposes, such as surveys of coverage areas in a wireless network, etc.

The above description is intended by way of example only. Various modifications and structural changes may be made therein without departing from the scope of the concepts described herein and within the scope and range of equivalents of the claims.

What is claimed is:

1. A method for classifying one or more wireless devices as being inside or outside a particular geographic region based on signals received from the one or more wireless devices, comprising:
    at a controller device in communication with one or more wireless access point devices, receiving a plurality of measurement data associated with signals received at the one or more wireless access point devices from a plurality of wireless client devices;
    after receiving the plurality of measurement data, dividing the measurement data into either an operational processing group or a training processing group;
    for the measurement data in the training processing group, performing a frequency nulling operation on the measurement data;
    classifying each of the measurement data associated with a corresponding one of the client devices as measurement data that is indicative of a location of the corresponding client device inside of the particular region or as measurement data that is indicative of a location of the corresponding client device outside of the particular region;
    determining information of an actual location for each of the client devices;
    classifying the information of the actual location as being indicative of a location inside of the particular region or as being indicative of a location outside of the particular region; and
    for a given client device whose classification of the information of the actual location does not match the classification of the corresponding measurement data, modifying the information of the actual location of the given client device.

2. The method of claim 1 wherein modifying comprises modifying the information of the actual location of the given client device such that the information of the actual location of the given client device is classified in a same area relative to the particular region as the measurement data associated with the given client device.

3. The method of claim 1, wherein receiving comprises receiving measurement data associated with signals received at the one or more wireless access point devices from at least one of the client devices whose location relative to the particular region is known to the controller device.

4. The method of claim 1, wherein classifying the measurement data comprises classifying the measurement data based on a prediction model generated by using a Support Vector Machine algorithm.

5. The method of claim 1, wherein receiving comprises receiving the measurement data from one or more wireless access point devices for client devices located within the particular region.

6. The method of claim 1, wherein receiving comprises receiving the measurement data from one or more wireless access point devices for client devices located either within the particular region or outside of the particular region, or from both wireless access point devices located within the particular region and wireless access point devices located outside the particular region.

7. The method of claim 1, wherein receiving comprises receiving a plurality of Received Signal Strength Indication (RSSI) data.

8. A non-transitory computer-readable storage media encoded with software comprising computer executable instructions for classifying one or more wireless devices as being inside or outside a particular geographic region based on signals received from the one or more wireless devices, and when the software is executed operable to:
    receive a plurality of measurement data associated with signals received at one or more wireless access point devices from a plurality of wireless client devices;
    divide the measurement data into either an operational processing group or a training processing group after receiving the plurality of measurement data;
    perform a frequency nulling operation on the measurement data in the training processing group;
    classify each of the measurement data associated with a corresponding one of the client devices as measurement data that is indicative of a location of the corresponding client device inside of the particular region or as measurement data that is indicative of a location of the corresponding client device outside of the particular region;
    determine information of an actual location for each of the client devices;
    classify the information of the actual location as being indicative of a location inside of the particular region or as being indicative of a location outside of the particular region; and
    modify the information of the actual location of a given client device whose classification of the information of the actual location does not match the classification of the corresponding measurement data.

9. The computer readable storage media of claim 8, wherein the instructions operable to modify comprise instructions operable to modify the information of the actual location of the given client device such that the information of the actual location of the given client device is classified in a same area relative to the particular region as the measurement data associated with the given client device.

10. The computer readable storage media of claim 8, wherein the instructions operable to receive comprise instructions operable to receive measurement data associated with signals received at the one or more wireless access point devices from at least one of the client devices whose location relative to the particular region is known to the controller device.

11. The computer readable storage media of claim 8, wherein the instructions operable to classify the measurement data comprise instructions operable to classify the measurement data based on a prediction model generated by using a Support Vector Machine algorithm.

12. The computer readable storage media of claim 8, wherein the instructions operable to receive the measurement data comprise instructions operable to receive the measurement data from one or more wireless access point devices for client devices located within the particular region.

13. The computer readable storage media of claim 8, wherein the instructions operable to receive the measurement data comprise instructions operable to receive the measurement data from one or more wireless access point devices for client devices located either within the particular region or outside of the particular region, or from both wireless access point devices located within the particular region and wireless access point devices located outside the particular region.

14. The computer readable storage media of claim 8, wherein the instructions operable to receive the measurement data comprise instructions operable to receive a plurality of Received Signal Strength Indication (RSSI) data.

15. An apparatus for classifying one or more wireless devices as being inside or outside a particular geographic region based on signals received from the one or more wireless devices, comprising:
    a network interface unit configured to enable network communications; and
    a processor coupled to the network interface unit, and configured to:
        receive via the network interface unit a plurality of measurement data associated with signals received at one or more wireless access point devices from a plurality of wireless client devices;
        divide the measurement data into either an operational processing group or a training processing group after receiving the plurality of measurement data;
        perform a frequency nulling operation on the measurement data in the training processing group;
        classify each of the measurement data associated with a corresponding one of the client devices as measurement data that is indicative of a location of the corresponding client device inside of the particular region or as measurement data that is indicative of a location of the corresponding client device outside of the particular region;
        determine information of an actual location for each of the client devices;
        classify the information of the actual location as being indicative of a location inside of the particular region or as being indicative of a location outside of the particular region; and
        modify the information of the actual location of a given client device whose classification of the information of the actual location does not match the classification of the corresponding measurement data.

16. The apparatus of claim 15, wherein the processor is further configured to modify the information of the actual location of the given client device such that the information of the actual location of the given client device is classified in a same area relative to the particular region as the measurement data associated with the given client device.

17. The apparatus of claim 15, wherein the processor is further configured to receive measurement data associated with signals received at the one or more wireless access point devices from at least one of the client devices whose location relative to the particular region is known to the controller device.

18. The method of claim 1, further comprising: after performing the frequency nulling operation, performing an analysis on the measurement data in the training processing group to produce weighted vector values that are used to build a location classification model for the measurement data.

19. The computer readable storage media of claim 8, further comprising instructions operable to:
    after performing the frequency nulling operation, perform a analysis on the measurement data in the training processing group to produce weighted vector values that are used to build a location classification model for the measurement data.

20. The apparatus of claim 15, wherein the processor is further configured to:
    after performing the frequency nulling operation, perform a analysis on the measurement data in the training processing group to produce weighted vector values that are used to build a location classification model for the measurement data.

* * * * *